United States Patent [19]
Ho et al.

[11] Patent Number: 6,055,278
[45] Date of Patent: *Apr. 25, 2000

[54] LINEARIZATION CIRCUITS AND METHODS

[75] Inventors: Ching Ho; Abraham Y. Jou, both of San Jose; Nelson M. Shen, Palo Alto, all of Calif.

[73] Assignee: C-COR.net Corporation, State College, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/638,551

[22] Filed: Apr. 26, 1996

[51] Int. Cl.[7] .............................. H04K 1/02; H04L 25/03; H04L 25/49

[52] U.S. Cl. ........................................... 375/296; 359/161

[58] Field of Search .................... 359/161, 153; 330/149, 124; 372/26, 29; 375/296, 285, 254; 455/114

[56] References Cited

U.S. PATENT DOCUMENTS

| | | | |
|---|---|---|---|
| 4,992,754 | 2/1991 | Blauvelt et al. | 330/149 |
| 5,321,710 | 6/1994 | Cornish et al. | 372/26 |
| 5,424,680 | 6/1995 | Nazarathy et al. | 330/149 |
| 5,436,749 | 7/1995 | Pidgeon, Jr. et al. | 359/161 |
| 5,481,389 | 1/1996 | Pidgeon et al. | 359/161 |
| 5,589,797 | 12/1996 | Gans et al. | 330/149 |

*Primary Examiner*—Chi H. Pham
*Assistant Examiner*—Jean B Corrielus
*Attorney, Agent, or Firm*—Sabath & Truong; Robert P. Sabath; John F. Schipper

[57] ABSTRACT

A predistortion circuit and method provides signals to oppose and cancel an anticipated phase and frequency distortion in a coupled electrical system. The predistortion circuitry includes first and second subcircuits which include opposing diodes, providing 180 degree out-of-phase and in-phase signals to produce second, third and higher order predistortion outputs.

9 Claims, 6 Drawing Sheets

LINEARIZATION CIRCUITS AND METHODS

TECHNICAL FIELD OF THE INVENTION

This invention relates to systems and methods for linearization of transfer functions for electrical systems such as for example a laser diode that converts multi-channel RF signals into optical signals, and more particularly relates to systems and methods for generation of pre-distorted signals to compensate for anticipated distortions in laser diode output signals.

BACKGROUND

The demand for greater numbers of TV channels in cable TV systems is increasing A typical cable TV system includes 60 analog TV channels, expandable in capacity to 80 or more channels.

In one contemplated information superhighway system, 132 or more digital channel, data channel, and telephony signals may be required in a cable TV system. Digital video, data and telephony signals are modulated on analog RF carriers. Digital video systems provide video on demand services.

Fiber optic transport systems are currently contemplated for carrying information from a cable TV headend center or from a telephone central office, to a fiber optics service node near subscribers. Coaxial cables may then be used for distribution of information to subscribers. A fiber optics system relies upon optical fiber as a transmission media. In such systems, a laser may be used to convert RF signals into optical signals, so that the signals can be transmitted in an optical fiber.

In order to ensure high fidelity delivery of information, a laser's transfer function for converting RF signals to optical signals must be linear. If the transfer function is not linear, harmonic generation, inter-modulation, and multiple beating between parallel channels will significantly reduce cable TV picture quality Unfortunately, the linearity of the transfer function of a laser is generally not sufficient to avoid distortion.

Methods for linearization of laser transfer functions have been studied for years. Such methods are generally complicated and costly to implement. In particular, optical feed forward techniques for linearization have been studied A great deal of laser distortion is due to operation under conditions of saturation. During operation in saturation, optical signals from a laser are reduced in proportion to RF signal magnitude, when the signal level of the laser is high. According to one known approach, a second laser is employed according to a known feed forward technique to generate a pre-distorted optical signal. A pre-distorted optical signal is then added to a main optical signal to compensate for laser saturation. Such compensation works, but there are three major disadvantages to this approach. First, the wavelengths of the two lasers have to be matched. If there is mismatch between the lasers due to fiber dispersion, for example, the two laser signals will travel at different speeds in the fiber, limiting linearization. Second, the output of the pre-distortion laser and the main laser change independently over time, causing undesirable linearization variations. Third, the use of multiple lasers is expensive, and the circuitry to implement optical feed-forward is costly. It is accordingly desirable that a pre-distortion solution be developed which is simple, low cost, and easy to implement.

Figure 1:
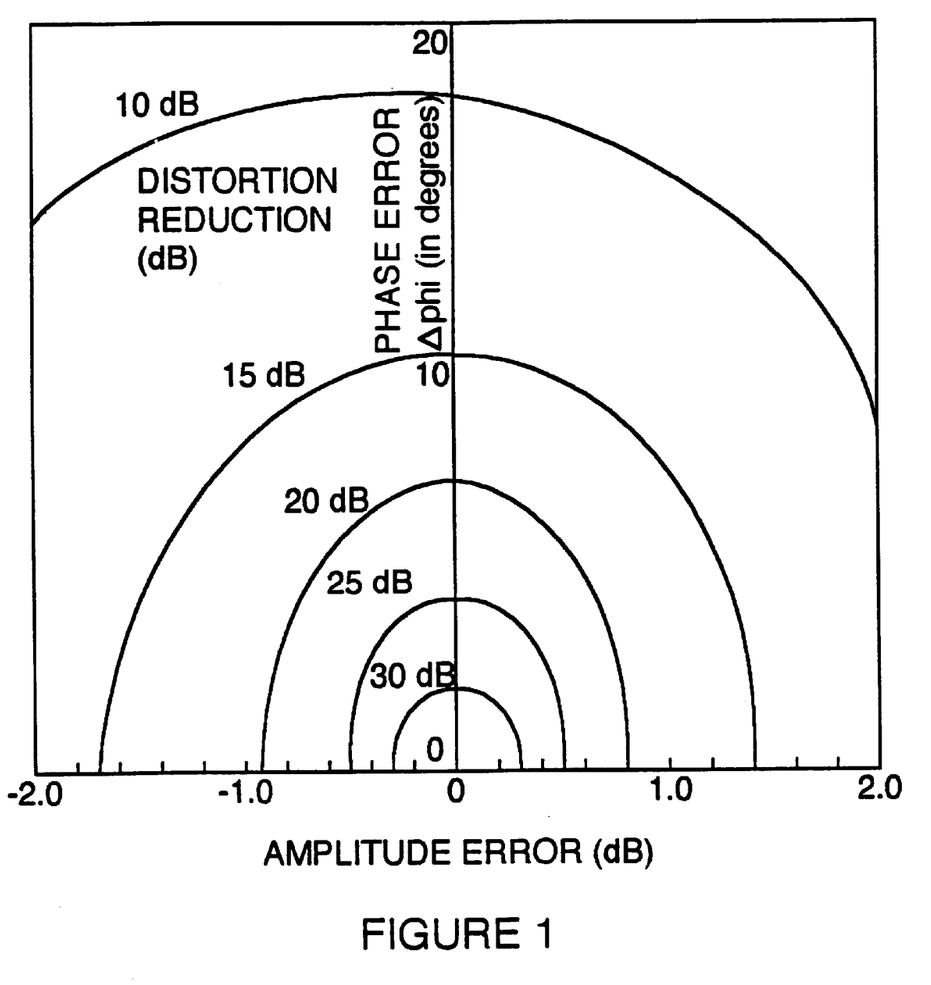
FIG. 1 is a graph of distortion reduction versus amplitude and phase error between a pre-distortion signal and the distortion caused by a laser transfer function.

FIG. 1 according to the published paper shows the linearity improvement of a transfer function of a microwave amplifier from the paper titled "Pre-distortion Nonlinear Compensator for Microwave SSB-AM System" published by Toshio Nojima et. al. in Electronics and Communications in Japan, Vol. 67-B, No. 5, 1984. According to FIG. 1, distortion reduction depends on amplitude and phase match between a pre-distortion signal and the distortion signal of an amplifier transfer function. Amplitude adjustment and phase adjustment circuits need to be added to minimize amplitude error and phase error of a pre-distorted signal and a distortion signal of a amplifier transfer function. Amplitude tuning and phase tuning can be employed according to the paper for narrow-band applications. In a broad-band system according to the present invention, bandwidth is from 50 MHz to 750 MHz, or even up to 1000 MHz. Such a frequency span covers 4 to 6 octaves As is well known, distortion is frequency dependent. Frequency dependent amplitude adjustment and phase adjustment of a pre-distorted signal are needed to ensure significant distortion reduction for an whole bandwidth.

SUMMARY OF THE INVENTION

A pre-distortion circuit and method are employed according to the present invention to anticipate the non-linearity of a laser or other electronic system or device, and to generate a pre-distortion signal which compensates for actual downstream distortion. The pre-distortion signal is substantially equal in magnitude but opposite in sign of the distortion signal produced by the downstream system subject to anticipatory signal compensation, according to the present invention. According to the present invention, the pre-distortion signals combine with the original linear signals to form predistorted signals. According to one embodiment, the pre-distorted signals are used to modulate a laser diode or an electrical system. The distortion signals compensate for anticipated distortions caused by the laser diode or other electrical system, leaving good quality signals such as CATV pictures, for example.

According to the present invention, distortions generated in a laser are canceled by inserting a pre-distortion signal of substantially the amplitude of the anticipated distortion, but opposite in phase throughout a selected frequency band. The improvement in reducing distortion according to the present invention depends on amplitude error and the phase error between the pre-distorted signal and the distortion signal generated by the distortion system transfer function. The amplitude error and phase error are also frequency dependent. In order to produce an error free optical signal according to the present invention, amplitude curve-fitting as a function of frequency pre-distortion is provided in conjunction with frequency curve fitting phase adjustment.

A laser which converts electrical signals to optical signals can be provided with input pre-distortion signals according to one embodiment of the present invention. In a CATV application, a laser is biased by a DC current to a constant operating optical power output. CATV signals at RF frequency are used to modulate the laser output power. For a linear transformation, the deviation of optical output power (P) is linearly proportional to the CATV RF current (I). The transfer function can be expressed as $P=A_1 I$. If the transfer function is not linear, the transfer function can be expressed by a Taylor series: $P=A_1 I + A_2 I^2 + A_3 I^3 + A_4 I^4 + \ldots$ where $A_2 I^2$ is a second order distortion and $A_3 I^3$ is a third order distortion.

According to the present invention, amplitude curve fitting as a function of frequency pre-distortion is combined with frequency curve fitting phase adjustment circuits. Second order and third order distortions generated by a laser or other physical system are canceled by inserting second order and third order pre-distortions. The second order and third order pre-distortions are equal in amplitude but opposite in phase with respect to distortions generated by the laser or other system. An RF signal input to the pre-distortion circuits according to the present invention is accordingly split into a main stream signal with a delay line and a minor stream RF signal, for generating pre-distortion signals. The minor stream is further split into two streams: one for generating a second order pre-distortion signal and the other for generating a third order pre-distortion signal.

In a second order pre-distortion path according to the present invention, a variable attenuation pad and an amplifier adjust the amplitude of the minor stream signal which in turn adjusts the second order pre-distortion signal. The minor signal is further split with a splitter to produce two signals which have a 180 degree phase shift with respect to each other. The two signals are separately fed into first and second matched diodes. Each diode has an independent bias control to balance the third order distortion of each diode. The signals from the two diodes are used to generate a second order pre-distortion and to suppress the linear signal and third order distortions. An amplitude curve fitting circuit which varies the amplitude of the pre-distortion signal with frequency is used to generate a frequency dependent pre-distortion which matches the distortion produced by the system in amplitude A phase curve fitting circuit which varies with frequency is used to generate a frequency dependent pre-distortion that matches the distortion of a laser in phase. A phase shifter is used to fine tune phase between a main delay line and the distortion producing system.

In a third order pre-distortion path according to the present invention, a variable attenuation pad and an amplifier are used to adjust the amplitude of the minor stream signal which in turn adjusts the third order pre-distortion signal. The input signal is further split with a splitter to produce two resultant signals. The two signals have the same phase with respect to each other The two resultant signals are then fed respectively into two matched independent diodes. Each diode has an independent bias control to balance the amplitude of the second order distortion from each of the diodes. The signals from the two diodes are used to generate a third order pre-distortion signal and to suppress second order distortions. An amplitude curve fitting circuit which varies the amplitude of the predistortion signal versus frequency is used to generate a frequency dependent pre-distortion that matches the distortion of a laser in amplitude. A phase curve fitting is used to generate a frequency dependent pre-distortion that matches the distortion of a laser in phase. A phase shifter is used to fine tune the phase difference between the main delay line and the distortion generating system.

The second and third order pre-distortion signals are combined, according to the present invention, and they are added to the main signal in the main stream RF signal. The resulting pre-distorted signal is used to modulate laser output power or the power of another electrical system subject to distortion. The pre-distorted RF signal improves the linearity of the transfer function of the laser.

DETAILED DESCRIPTION OF THE INVENTION

Figure 2:
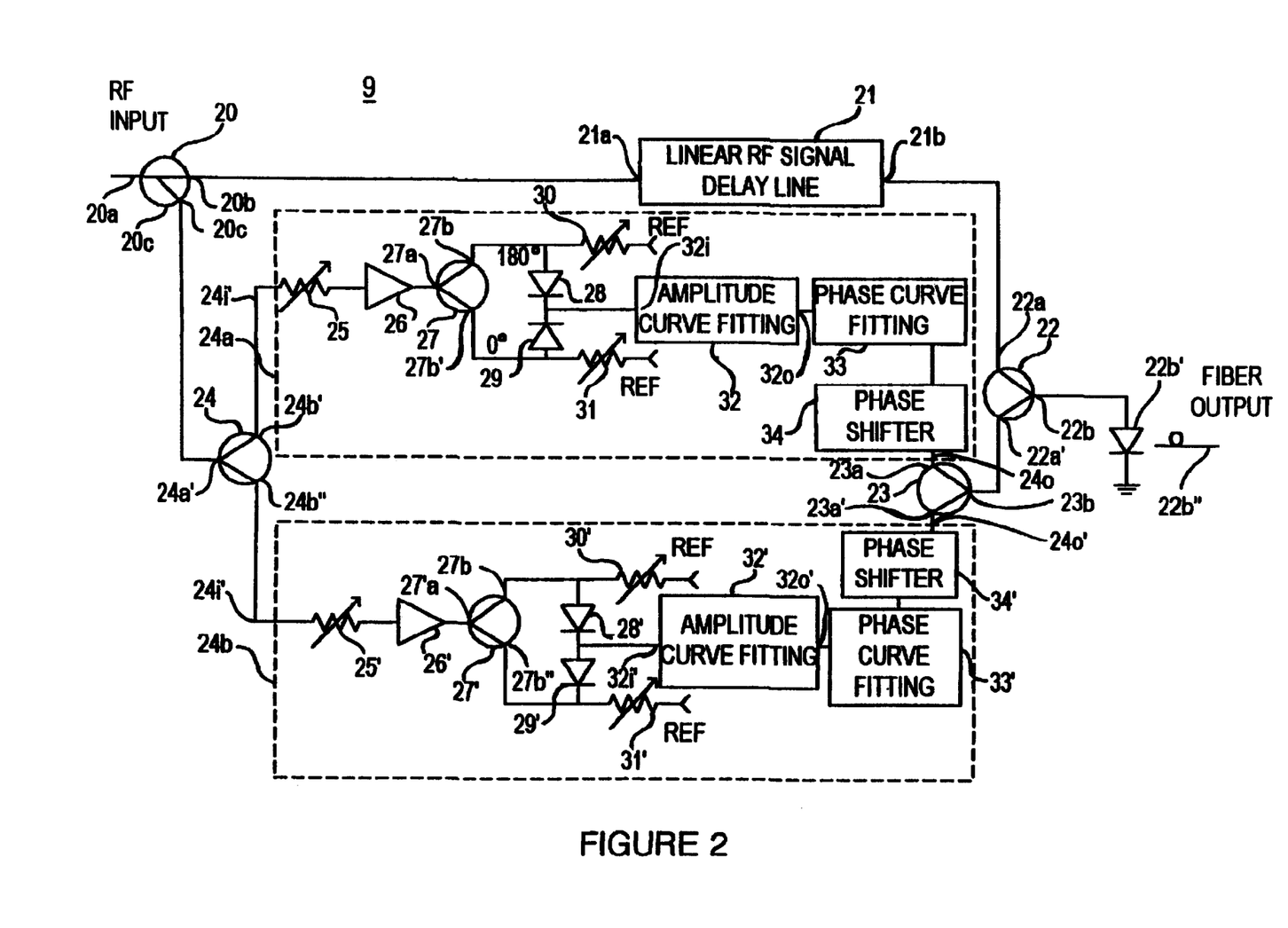
FIG. 2 is a block diagram of a pre-distortion circuit according to an embodiment of the present invention.

FIG. 2 is a circuit design of a pre-distortion circuit 9 according to the present invention. In particular, pre-distortion circuit 9 includes a splitter 20, a linear radio frequency (RF) signal delay line 21, a combiner 22, a combiner 23, a splitter 24, and first and second subcircuits 24a and 24b. First subcircuit 24a produces a second order predistortion signal, and second subcircuit 24b produces a third order predistortion signal. Splitter 20 includes an input terminal 20a, a first output terminal 20b, and a second output terminal 20c. A radio frequency (RF) input signal is provided to input terminal 20a splitter 20. The splitter 20 divides an input analog signal into first and second signal streams output at respective outputs 20b and 20c. The respective signal levels of the output signal streams at outputs 20b and 20c have ratios in the range of 98:2 to 80:20. The first signal stream is the main signal to drive a laser 22b' and fiber optic line 22b". Linear RF signal delay line 21 in FIG. 2 includes an input terminal 21a and an output terminal 21b. Output terminal 20b of splitter 20 is connected to input terminal 21a of linear RF signal delay line 21. Combiner 22 includes first and second inputs 22a and 22a' respectively, and an output 22b. Output terminal 21b of linear RF signal delay line 21 is connected to first input 22a of combiner device 22. Splitter 24 includes a input terminal 24a' and first and second output terminals 24b' and 24b" respectively. Combiner device 23 includes first and second input terminals 23a and 23a' respectively, and an output terminal 23b. Subcircuits 24a and 24b include respective input ports 24i and 24i' and output ports 24o and 24o'. Output terminal 24b' of splitter 24 is connected to input port 24i of subcircuit 24a, and output terminal 24b" of splitter 24 is connected to input part 24i' of subcircuit 24b. Output port 24o of subcircuit 24a is connected to input terminal 23a of splitter 23, and output port 24o' of subcircuit 24b is connected to input terminal 23a' of combiner 23. Subcircuit 24a includes variable attenuator 25, amplifier 26, splitter device 27, diodes 28 and 29, variable attentuators 30 and 31, amplitude curve fitting circuit 32, phase curve fitting circuit 33, and phase shifter 34. Variable attenuators 30 and 31 are set during operation to ensure cancellation of second order predistortion and the original signal contribution. Subcircuit 24b includes variable attenuator 25', amplifier 26', splitter 27', diodes 28' and 29', variable attentuators 30' and 31', amplitude curve fitting circuit 32', phase curve fitting circuit 33', and phase shifter 34'.

Figure 3:
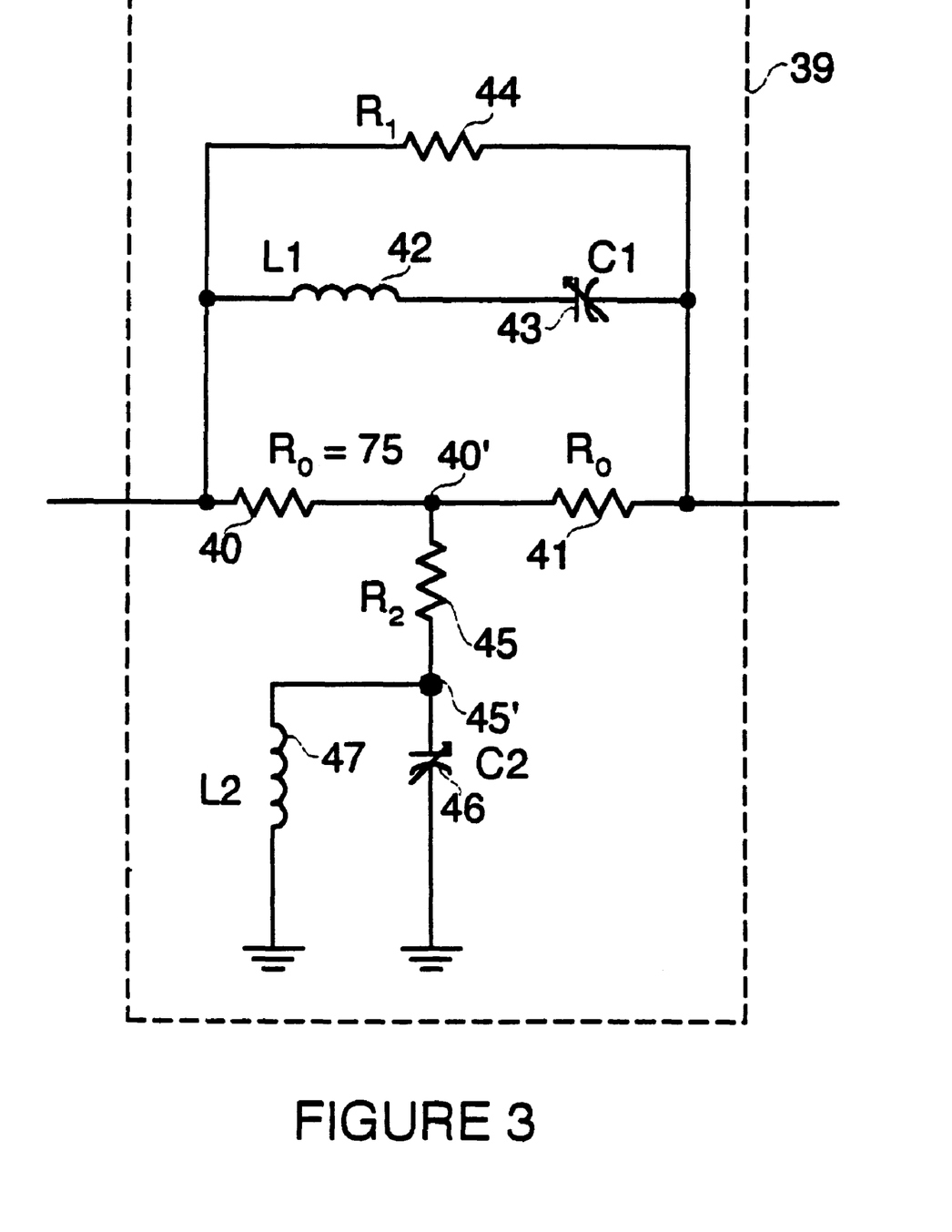
FIG. 3 is a circuit diagram of a circuit for adjustment of an amplitude curve fitting in a pre-distortion signal, according to an embodiment of the present invention.

Amplitude curve fitting circuits 32 and 32' are generally shown in the circuit 39 in FIG. 3. By selecting the values of R1, R2, L1, L2, C1 and C2 as per FIG. 4, specific circuits 32 and 32' are constructed to conform to second and third order transfer function measurements actually made by trial and error adjustments made in the factory or elsewhere.

Referring again to FIG. 2, variable attenuator 25 in FIG. 2 is connected to input port 24*i* of subcircuit 24*a* and to the input of amplifier 26. Splitter 27 includes an input terminal 27*a*, and in-phase output 27*b* and 180 degree out-of-phase output 27*b*' and 27*b*. Variable attenuator 30 is connected between a selected reference voltage (REF) and the input of diode 28. Variable attenuator 31 is connected between a selected reference voltage (REF) and input of diode 29. Amplitude curve fitting circuit 32 includes input and output terminals respectively 32*i* and 32*o*. Input terminal 32*i* of amplitude curve fitting circuit 32 is connected to the output terminals of diodes 28 and 29, which in turn are connected to each other so that current flows from the outputs 27*b* and 27*b*' of splitter 27 to amplitude curve fitting circuit 32 through both diodes 28 and 29. Amplitude curve fitting circuit 32 is connected to phase curve fitting circuit 33 which in turn is connected to phase shifter circuit 34, and phase shifter circuit 34 is connected to the output 24*o* which is connected to input 23*a* of combiner 23.

Variable attenuator 25' is connected to input port 24*i*' of subcircuit 24*b* and to the input of amplifier 26'. Splitter 27' includes an input terminal 27'*a* and first and second output terminals respectively 27*b*' and 27*b*". Variable attenuator 30' is connected between a selected reference voltage (REF) and input terminal of diode 28'. Variable attenuator 31' is connected between a selected reference voltage (REF) and input of diode 29'. Variable attenuators 30' and 31' are set during operation to ensure cancellation of second order predistortion.

Amplitude curve fitting circuit 32' includes input and output terminals respectively 32*i*' and 32*o*'. Input terminal 32*i*' of amplitude curve fitting circuit and 32' is connected to diodes 28' and 29', which in turn are connected to each other so that current flows from outputs 27'*b* and 27'*b*' of splitter 27' to amplitude curve fitting circuit 32' through diodes 28' and 29'. Amplitude curve fitting circuit 32' is connected to phase curve fitting circuit 33'. Phase curve fitting circuit 33' is in turn connected to phase shifter 34'. Phase shifter 34' is connected to subcircuit output port 24*o*'.

The analog RF input signal is split according to a selected ratio into two streams by splitter 20. The preferred split ratio is in the range of 98:2 to 80:20. According to one embodiment, the split ratio is 90:10. The invention is, however, operable with other ratios. The main stream includes coaxial delay 21 line to compensate the delay caused by the signal path length, as well as the electronic delay of the second order and third order pre-distortion generation provided by respective subcircuits 24*a* and 24*b*. The path length for the main line in one embodiment is about 14 inches. The minor stream is further split substantially equally by splitter 24. The path of subcircuit 24*a* provides second order pre-distortion generation and the path of subcircuit 24*b* provides third order pre-distortion generation.

In a second order pre-distortion path through subcircuit 24*a*, the amplitude of the second order pre-distortion signal is controlled by a variable attenuator 25 and amplifier 26. Variable attenuator 25 may include a resistor network. Attenuation according to one embodiment is up to 5 dB. The RF signal input is amplified by amplifier 26 to a desired signal level. The resulting signal is then split by a splitter 27. Output 27*b* of splitter 27 provides a 180 degree phase shift with reference to the signal at input 27*a*. Output 27*b*' of splitter 27 provides no phase shift to the input signal. The two output signals from splitter 27 are then capacitively coupled and fed into two matched and opposing diodes, 28 and 29. The input signals to diodes 28 and 29 are preferably 180 degrees out of phase, but the invention is workable for other values of out of phase signals up to approximately 180±30 degrees. Each diode 28, 29 has independent bias control. Each of the diodes 28 and 29 generates second order, third order, and higher order distortions, as well as passing the linear input signal. The amount of distortion from diodes 28 and 29 can be adjusted by bias networks 30 and 31 respectively. The linear signals and the odd order distortions produced by diode 28 are adjusted to have substantially the same amplitude but 180 degrees out of phase with respect to the signals from diode 29, while even order pre-distortion from diodes 28 and 29 is set to be in phase. Variable capacitors are used to fine tune the phase differences between signals from diode 28 and diode 29. Variable attenuators are used to generate the characteristic of predistortion and fine tune amplitude differences between the signals from diode 28 and diode 29. The two signals are combined at the connection between diodes 28 and 29 to produce an even order pre-distortion signal only. An amplitude curve fitting circuit 32 is used to tune the amplitude of a pre-distortion signal as a function of frequency to compensate for the expected frequency dependence of the laser distortion in amplitude. Phase curve fitting circuitry 33 is used to tune the phase of a pre-distortion signal as a function of frequency to compensate for expected laser phase distortion. The series combination of amplitude curve fitting and phase curve fitting circuits permits correction of frequency dependent distortion. A capacitor is used as a phase shifter to fine tune the phase difference between the main delay line and subcircuit 24*a*. A phase curve fitting circuit 33 along frequency is described in FIG. 5 for use to match frequency dependence of laser distortion in phase.

In a third order pre-distortion path through subcircuit 24*b*, the amplitude of the third order pre-distortion signal is controlled by a variable attenuator 25' and amplifier 26'. Variable attenuator 25' may include a resistor network. Attenuation according to the present invention may be up to 5 dB. The RF signal is amplified by amplifier 26' to a desired signal level. The resulting signal is split again by the splitter 27'. Both of the outputs of splitter 27' have no phase shift. The two output signals from splitter 27' are then capacitively coupled and fed into two matched diodes, 28' and 29', separately. Each of diodes 28', 29' has an independent bias control. Each of the diodes 28' and 29' generates second order, third order, and higher order distortion signals as well as passing the linear input signal. The amount of distortion at each diode of 28' and 29' can be adjusted by a suitable bias network including for example fixed and variable attenuator and a reference voltage of +5 volts. The even order distortions out of diodes 28' and 29' are adjusted to have the same amplitudes but to be 180 degrees out of phase, while the odd order pre-distortion signals are substantially, i.e., within + or −30 degrees, in phase. Variable capacitors are used to fine tune the phase difference between signals from diode 28' and diode 29'. Variable attenuators are also used to fine tune the amplitude difference between the signals from diode 28' and diode 29'. The two signals from diodes 28' and 29' are combined to produce an odd order pre-distortion signal. Tilt tuning can be accomplished with fixed and tunable circuitry. For example, an inductor can be used to produce a fixed tilt, while a tunable curve fitting filter as in FIG. 3 can produce a fitting curve. Respective amplitude and phase curve fitting circuits 32' and 33' permit correction of frequency dependent distortion. A capacitor can be used as a phase shifter to fine tune the phase difference between the main delay line and subcircuit 24*b*. A phase curve fitting circuit 33' according to the present invention is described in FIG. 5 to compensate for expected frequency dependence of laser distortion in phase.

The second and third order pre-distortion signals are combined by combiner 23 and are added to a main signal with combiner 22 to produce output RF signal with predistortion at output 22b. A capacitor can be used to fine tune the phase relationship between the main signal at input 22a and the pre-distortion signal at input 22a'. The pre-distortion signals from subcircuits 24a and 24b are tuned to be of equal amplitude and of a phase inverse to the distortion to be produced by a laser or other distortion producing system. The generated pre-distortion and actual distortion signals substantially cancel each other due to the tuning effect of amplitude curve fitting and phase curve fitting adjustment established over an entire selected frequency bandwidth. The pre-distorted RF signal thus establishes overall linearity of the transfer function of the laser or other distortion producing system for a wide spectrum of input RF signals.

Coaxial delay 21 line in FIG. 2 compensates for the delay caused by the signal path length, as well as the electronic delay of the second order and third order pre-distortion subcircuits 24a and 24b. The path length from splitter 20 to combiner 22 in one embodiment of the present invention is about 14 inches. The signal stream from output 20c of splitter 20 is split equally by splitter 24 at first and second outputs 24b' and 24b". The path from output 24b' provides second order pre-distortion generation through subcircuit 24a, and the path from output 24b" provides third order predistortion through subcircuit 24b generation.

Figure 4:
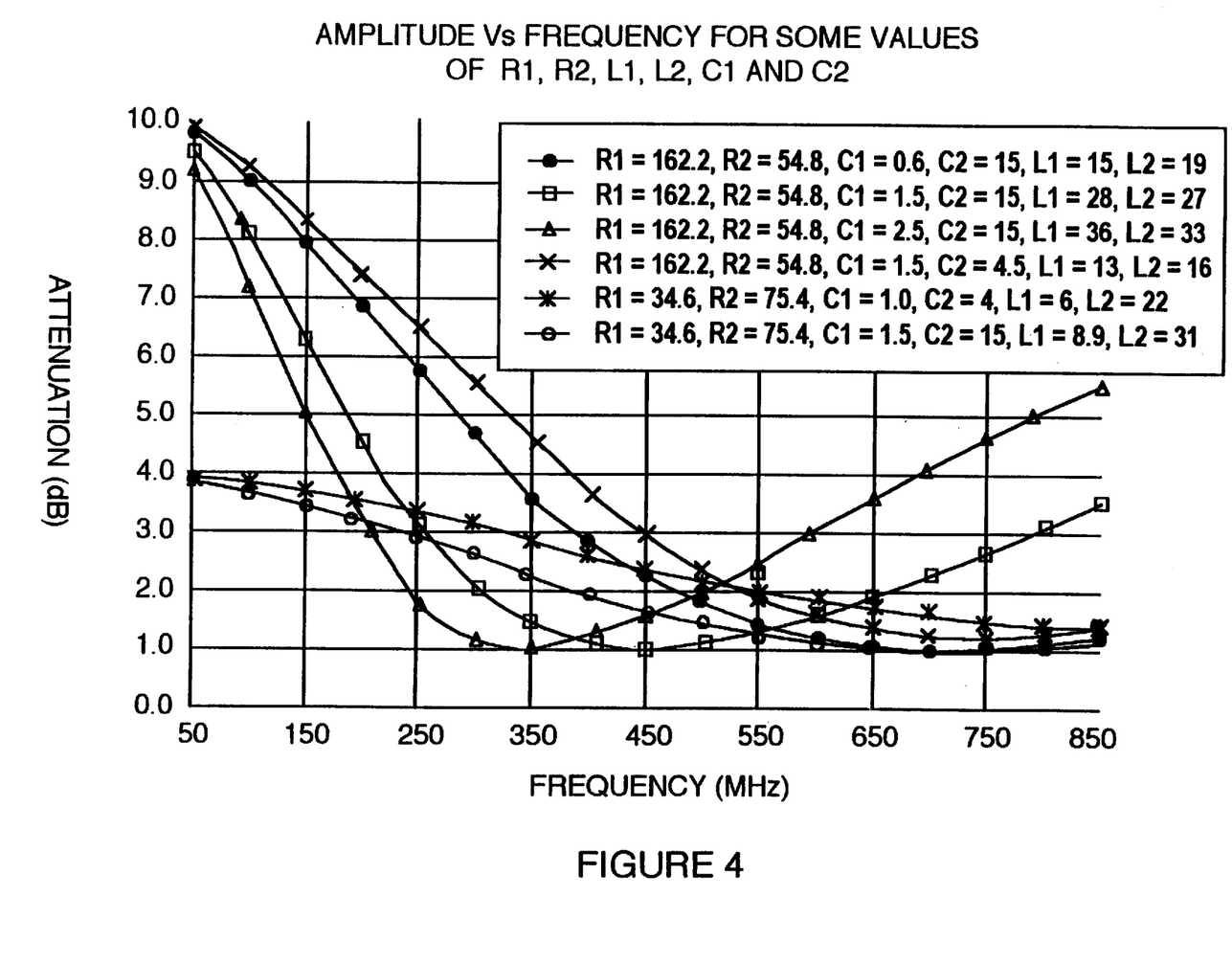
FIG. 4 is a graph of an amplitude attenuation characteristic with respect to the circuit in FIG. 3, according to the present invention.

FIG. 3 is a diagram of an amplitude curve fitting circuit 39 according to an embodiment of this invention. In particular, amplitude curve fitting circuit 39 includes first and second resistors 40 and 41 connected to each other in series at a common node 40'. Amplitude curve fitting circuit 39 further includes an inductor 42 (L1) and a variable capacitor 43 (C1), which are connected in series with each other. Inductor 42 and variable capacitor 43 are further connected in parallel with resistors 40 and 41. Circuit 39 further includes a resistor 44 which may have a value of 162 ohms according to one embodiment of the present invention. Resistor 44 is connected in parallel with resistors 40 and 41. Circuit 39 further includes in series connection resistor 45 (R2) and variable capacitor 46(C2), connected between node 40' and ground. Circuit 39 further includes inductor 47(L2). Resistor 45 and capacitor 46 are connected at common node 45'. Inductor 47 is connected between common node 45' and ground. Ro is the value of resistor 40 that sets the input and output impedance of circuit 39. Resistors R1 and R2 set the maximum attenuation of circuit 39. For example for $R_1=162$ ohms and $R_2=34.7$ ohms, the maximum attenuation is 10 dB. Inductors L1, L2 and capacitors C1, C2 set the shape of the attenuation curve. With respect to laser predistortion, it is advantageous that the attenuation for amplitude curve fitting of a pre-distortion signal according to the present invention be set to high at low frequency, to result in higher pre-distortion output at higher frequencies. This compensates for actual distortion of a laser which is greatest in the high frequency range of its operational bandwidth. Examples of curves for R1, R2, L1, L2, C1, and C2 values are shown in FIG. 4. In FIG. 4, value R is resistance in ohms, value C is capacitance in picofarads, and value L is inductance in nanohenrys. The pre-distortion curve according to the present invention can be tuned to inversely match the distortion curve of an actual laser or other instrument and to cancel that distortion over an entire selected bandwidth.

Figure 5:
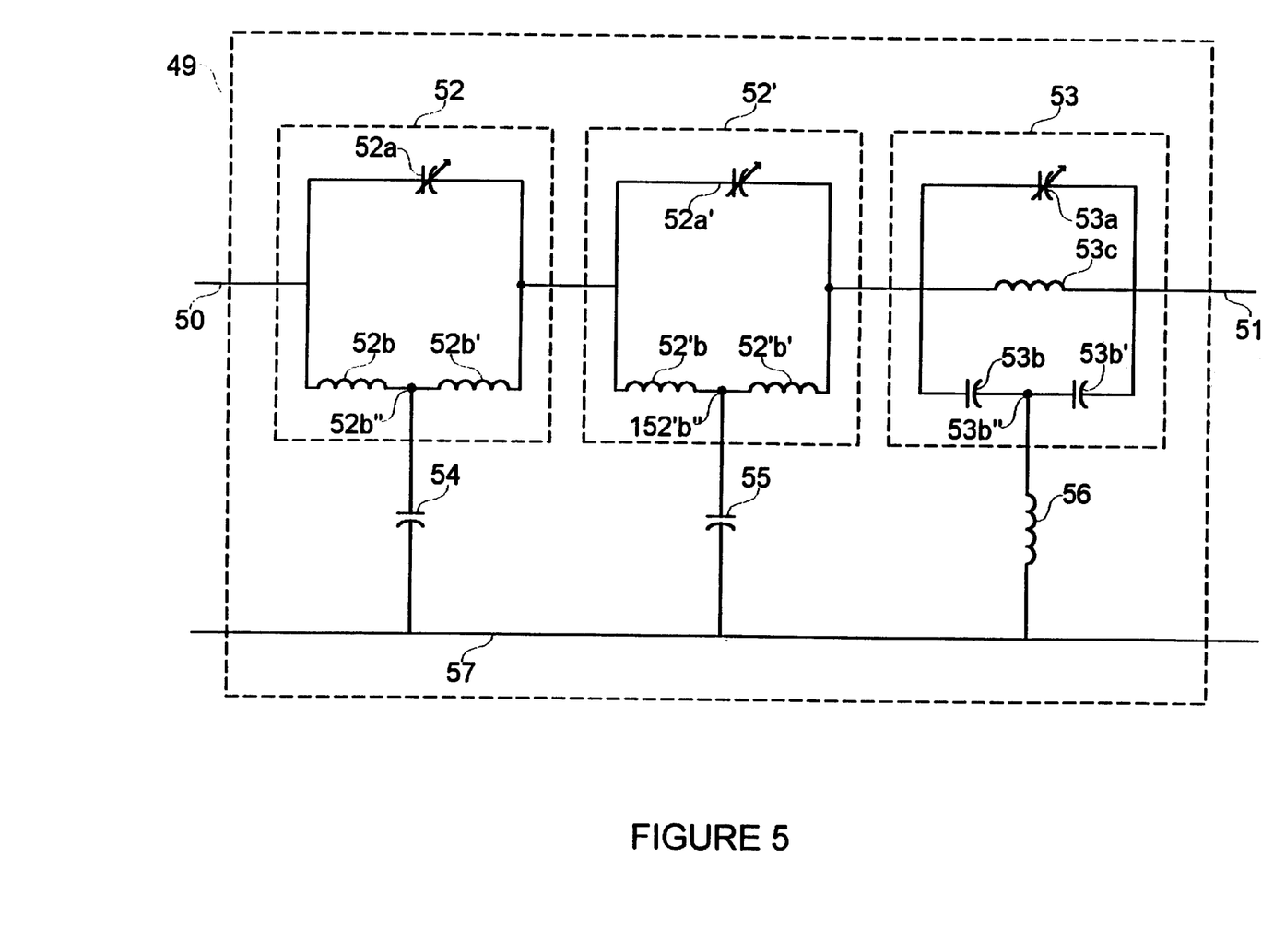
FIG. 5 is a circuit diagram of an adjustment circuit of phase curve fitting for a pre-distortion signal according to an embodiment of the present invention.

FIG. 5 is a diagram of a phase curve fitting circuit 49, according to the present invention, for adjustment of the phase curve fitting of a pre-distortion signal. In particular, phase curve fitting circuit 49 according to the present invention includes first and second terminals 50 and 51; first, second, and third subcircuits 52, 52', and 53, first and second capacitors 54 and 55; an inductor 56, and a common node 57. First subcircuit 52 includes a variable capacitor 52a, and first and second inductors 52b and 52b' in parallel with variable capacitor 52a and in series with each other. Inductors 52b and 52b'are connected to each other at a common node 52b". First terminal 50 of phase curve fitting circuit 49 is connected to variable capacitor 52a and to first inductor 52b of first subcircuit 52. Second subcircuit 52' includes a variable capacitor 52'a, and first and second inductors 52'b and 52'b' in series with each other and in parallel with variable capacitor 52'a. Inductors 52'b and 52'b' are connected to each other at common node 52'b". Variable capacitor 52'a and first inductor 52'b are connected to each other and to variable capacitor 52a' and to second inductor 52b'. Third subcircuit 53 includes a variable capacitor 53a and an inductor 53c in parallel with each other. Third subcircuit 53 further includes first and second capacitors 53b and 53b' connected in series with each other at a common node 53b" and collectively connected in parallel with inductor 53c. Variable capacitor 53a, inductor 53c, and second capacitor 53b ' are connected to output part 51. Capacitor 54 is connected between common node 52b" and common node 57; capacitor 55 is connected between common node 52'b" and common node 57; and inductor 56 is connected between common node 53b" and common node 57. By tuning capacitor values, a frequency dependent phase delay can be tuned to match the frequency dependent phase shift of distortion signals induced by a laser.

Figure 6:
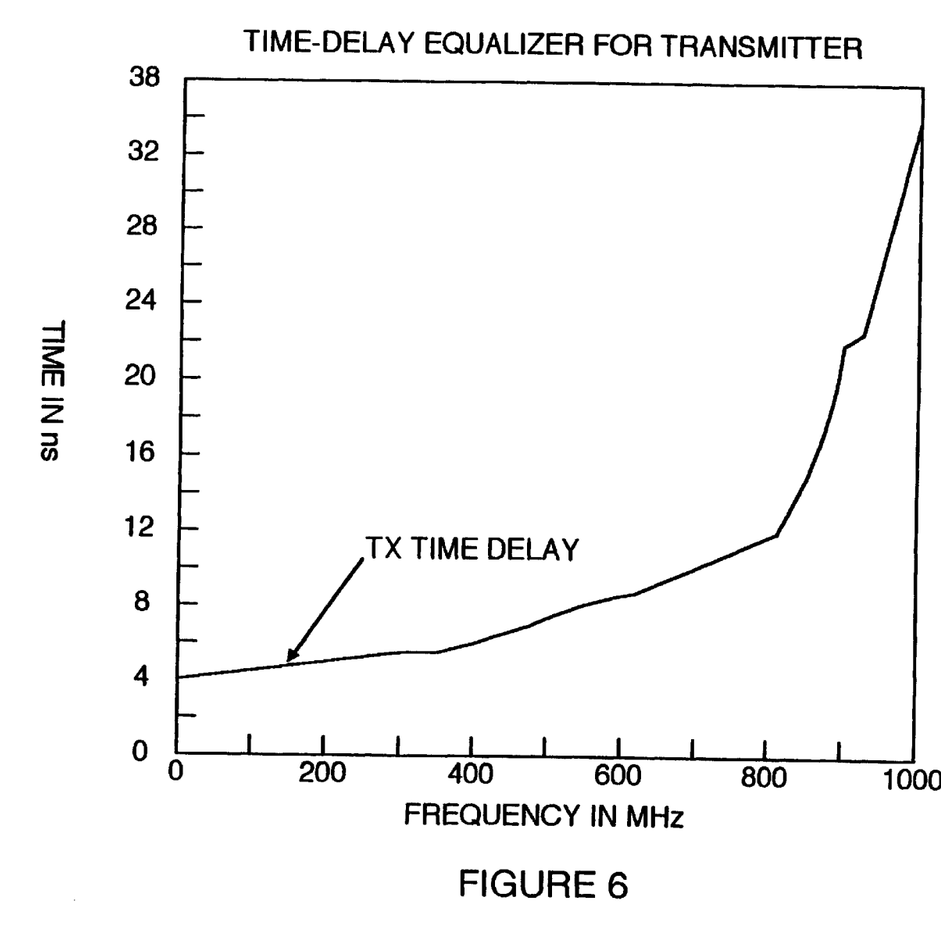
FIG. 6 is a phase delay characteristic representation of the circuit of FIG. 5 according to the present invention.

FIG. 6 shows a single selected phase delay characteristic of predistortion circuitry 9. By adjusting variable capacitors 52a, 52a', and 53a in the circuit 49 (FIG. 5) at the factory or elsewhere, the TX TIME DELAY Curve can be modified to compensate for the laser characteristic.

What is claimed is:

1. A system for linearizing a non-linear electrical system, comprising:

a first signal splitter for dividing an input radio frequency signal into first and second radio frequency signals, said first signal splitter having primary and secondary first signal splitter output signals, said first signal splitter primary output signal providing a major signal, said first signal splitter secondary output signal providing a minor signal;

a second signal splitter having a second signal splitter input connected to receive said first signal splitter secondary output signal, said second signal splitter having second signal splitter primary and secondary output signals, said second signal splitter primary output signal including a second order pre-distortion output signal and said second signal splitter secondary output signal including a third order pre-distortion output signal;

a third signal splitter having a third signal splitter input connected to receive said second splitter primary output signal, said third signal splitter having third signal splitter primary and secondary output signals, said third signal splitter primary output signal having a selected phase shift relative to the second splitter output signal received at said third signal splitter input, said third signal splitter secondary output signal having a phase shift which is substantially 180 degrees out of phase with said selected phase shift;

first and second opposing diodes respectively connected to receive said third signal splitter primary and secondary output signals, said first and second opposing diode outputs being connected to produce an output signal including a second order pre-distortion signal;

a fourth signal splitter having a fourth signal splitter input connected to receive said second signal splitter secondary output signal, said fourth signal splitter having fourth signal splitter primary and secondary output signals which are substantially in phase with each other;

first and second non-opposing diodes respectively connected to receive said fourth signal splitter output signals, said first and second non-opposing diode outputs being connected to produce an output signal including a third order pre-distortion signal; and a signal combiner connected to receive said output signals from said opposing diodes and from said non-opposing diodes, to combine said second order and said third order pre-distortion signals, to provide a compensating signal.

2. The system according to claim 1, further comprising at least one amplitude curve fitting adjustment device.

3. The system according to claim 1, further comprising at least one phase curve fitting adjustment device.

4. The system according to claim 1, further comprising a second signal combiner receives and combines said major signal with said compensating signal.

5. A method of producing a composite pre-distortion signal to compensate for a non-linear signal characteristic, comprising:

splitting an input radio frequency signal into first and second input signals;

processing said first input signal to produce a first signal first component and a first signal second component that have substantially the same amplitude and that are substantially 180 degrees out of phase with each other, passing said first signal first component and said first signal second component through first and second diodes, respectively, oriented in the same direction, and combining output signals from said first and second diodes to produce a first processed signal;

processing said second input signal to produce a second signal first component and a second signal second component that have substantially the same amplitude and that have substantially zero degrees phase shift with respect to each other, passing said second signal first component and said second signal second component through third and fourth diodes, respectively, oriented in opposite directions, and combining output signals from said third and fourth diodes to produce a second processed signal;

passing said first processed signal through a first frequency dependent, curve fitting processor to produce a first pre-distortion signal having suppressed distortion from odd order signals;

passing said second processed signal through a second frequency dependent, curve fitting processor to produce a second pre-distortion signal having suppressed distortion from even order signals; and combining said first and second pre-distortion signals to produce the composite pre-distortion signal that compensates for a non-linear characteristic in said input radio frequency signal.

6. The method according to claim 5, further comprising providing first and second pre-distortion patterns in said first and second curve fitting processors, respectively, that are selected to suppress a known signal distortion pattern.

7. The method according to claim 5, further comprising suppressing a known distortion pattern of an electrical system using a pre-distortion signal having a transmission bandwidth at second order, third order, and higher orders of frequency dependent amplitude.

8. The method according to claim 5, further comprising suppressing a known distortion pattern of an electrical system using a pre-distortion signal having a transmission bandwidth at second order, third order, and higher orders of frequency dependent phase.

9. The method according to claim 5, further comprising combining said input radio frequency signal and said composite pre-distortion signal.

* * * * *